J. HARRISON, Jr.
MACHINE FOR MAKING COILED SPRINGS.
No. 16,483. Patented Jan. 27, 1857.
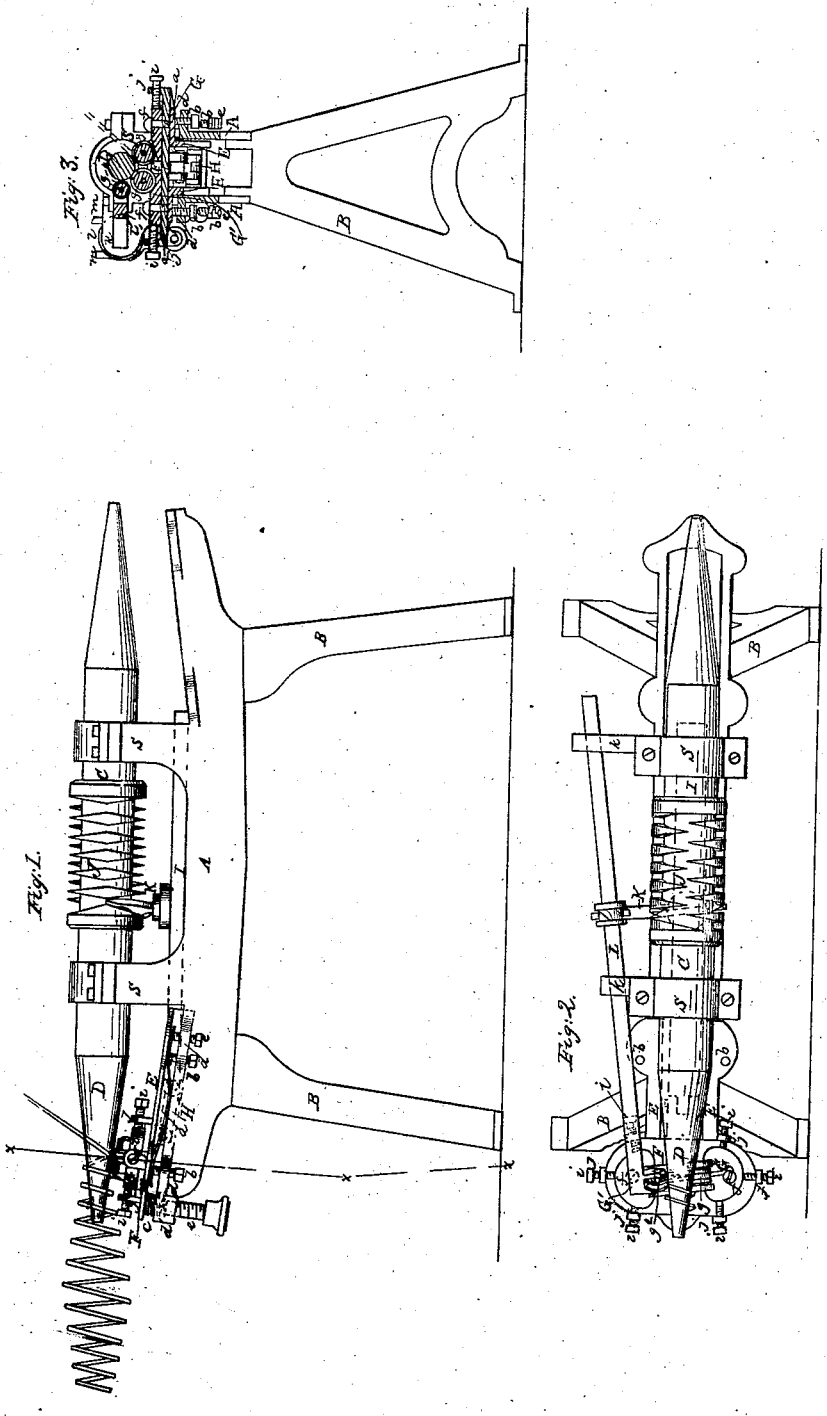

UNITED STATES PATENT OFFICE.

JAMES HARRISON, JR., OF NEW YORK, N. Y.

IMPROVED MACHINE FOR MAKING COILED SPRINGS.

Specification forming part of Letters Patent No. 16,483, dated January 27, 1857.

*To all whom it may concern:*

Be it known that I, JAMES HARRISON, Jr., of the city, county, and State of New York, have invented a new and useful Improvement in Machinery for Making Coiled Springs for Upholstery and other Purposes; and I do hereby declare that the following is a full, clear, and exact description of the same, reference being had to the accompanying drawings, forming part of this specification, in which—

Figure 1 is a side elevation of a machine constructed according to my invention. Fig. 2 is a plan of the same. Fig. 3 is a transverse vertical section of the same in the line $x$ $x$ of Fig. 1.

Similar letters of reference indicate corresponding parts in the several figures.

This invention consists in a certain arrangement of rollers, applied and operating as hereinafter described, in connection with a mandrel whose form is that of a single cone, to produce double conical coiled springs—such as are commonly used for upholstery—by a continuous operation, as many springs as can be made from a piece of wire of any length being formed and delivered without any stoppage of the machine. By this improvement the springs are not only produced more rapidly, and consequently more cheaply, than the springs made by other means, but are of better quality.

To enable others to make and use my invention, I will proceed to describe its construction and operation.

A is a stationary bed supported on standards B B, and carrying the bearings S S for a horizontal shaft, C, at one end of which there is formed or secured the mandrel D, whose form is that of a truncated cone.

E is an adjustable bed supported on two springs, $a$ $a$, and a third spring, $c$, that rest on the stationary bed A under the mandrel D.

$b$ $b$ are screws passing loosely through ears $d$ $d$ on the sides of the stationary bed A, and screwing into the adjustable bed E, said screws being furnished with heads at the bottom to prevent the adjustable bed being raised above a certain height by the springs $a$ $a$.

$e$ $e$ are screws screwing through the ears $d$ $d$, and standing above the face of the stationary bed A, to serve as stops to prevent the descent of the adjustable bed E beyond a certain distance, and $e^*$ is another screw screwing through an ear, $d^*$, on the stationary bed, for the same purpose.

F is a carriage fitted to travel on the adjustable bed E in a direction parallel with a vertical plane passing through the center of the mandrel D, said carriage supporting the bearings G G' of two rollers, $g$ $g'$, whose duty is to confine the wire from which the springs are to be made in contact with the mandrel D, said rollers being properly grooved in their peripheries to receive the wire. The springs $a$ $a$, holding up the adjustable carriage, cause the rollers $g$ $g'$ to press the wire firmly against the surface of the mandrel.

The bearings G G' of the rollers are secured to the carriage F by means of screws $f$ $f$, passing through slots, which allows them to be adjusted to bring the rollers to an inclination to the axis of the conical mandrel, to correspond with the helical form to be given to the spring, and also allows them to be adjusted in such relation to each other that the wire, in passing from one roller to the other in contact with the conical mandrel, will have the required inclination. The bearings G G' are each adjusted and kept in place by means of three screws, $i$ $i$ $i$, working through lugs $j$ $j$ $j$ on the adjustable bed E. The adjustable bed E is set at such an inclination that the carriage F, in moving along it, will cause the rollers $g$ $g'$ to move as nearly as possible in lines parallel with the nearest longitudinal profile lines of the conical surface of the mandrel, that part of the stationary bed over which the adjustable bed is placed having about the same inclination; but the springs $a$ $a$ under the adjustable bed will allow the rollers to accommodate themselves exactly to the profile of the mandrel and to the varying diameter thereof.

H is a connecting-link, by which the carriage F is connected with a bar, I, that is fitted to slide longitudinally parallel with the axis of the shaft C in guides attached to the stationary bed A.

J is a double screw whose threads cross each other on the shaft C, and K is a fork attached to the sliding bar I and engaging with the double-threaded screw on the shaft. This screw and fork constitute a well-known device for converting continuous rotary into reciprocating rectilinear motion, and serve to impart motion from the shaft C to the bar I to move the rollers $g$ $g'$ along the face of the conical mandrel.

L is a bar working through guides $k$ $k$, attached to the bearings S S, in a direction parallel with the nearest longitudinal profile line of the conical mandrel, and carrying a roller, $g^2$, which operates in the same manner as the rollers $g$ $g'$, to confine the wire to the surface of the conical mandrel, the said roller $g^2$ being set in such relation to the rollers $g$ $g'$ as to cause the wire, in passing from them to it, to produce the desired helical form. The bar L has a grooved collar, $l$, keyed to it, which is embraced by a fork, $m$, attached by a joint to the sliding bar I, so as to cause the roller $g^2$ to travel along the face of the cone simultaneously with the rollers $g$ $g'$. The rollers $g$ $g'$ $g^2$ are smoothly grooved, but the conical mandrel has a roughened surface, in order that the latter may have a bite upon the wire passing between the rollers, and that the rollers may not prevent this bite, but only confine the wire to the surface of the mandrel and direct it. The machine will operate with two rollers; but I prefer to use three, as it makes the operation more certain.

The operation of the machine is as follows: The wire, which is represented in red color in the several figures, has its end introduced between the mandrel and the rollers $g$ $g'$ $g^2$, as is shown in Fig. 3, and on a continuous rotary motion being imparted to the shaft C in the proper direction, which, to correspond with the direction of the inclination of the rollers $g$ $g'$ $g^2$, must be in the direction of the arrow shown in Fig 3, the rollers $g$ $g'$ $g^2$ all receive a motion back and forth along the face of the revolving mandrel; and the wire being drawn between the rollers and the mandrel, by the friction of the rough surface of the mandrel, causes the rollers to revolve and conduct the wire with very little friction around the mandrel, causing the wire to keep moving spirally toward the nose of the mandrel. The movement of the rollers longitudinally to the mandrel causes every portion of the wire to assume the circular form of that portion of the mandrel in contact with which it passes in moving from the first roller, $g$, to the third, $g'$, and hence, as the rollers move from the nose or truncated end of the mandrel toward the base, the diameter of the spiral being formed is constantly increasing, and as the rollers move in the opposite direction the said diameter is diminishing, thus causing the spirally-wound wire to assume the form of a series of truncated cones, each being united at its base and truncated end with the base and truncated end of the next ones on either side of it, each two united cones, &c. being separated from the others at their bases, constituting a double conical spring. The operation will continue in this manner till the whole of a piece of wire of any length whatever is formed into springs without any stoppage of the machine, the springs being delivered from the machine by the movement the wire receives in being coiled and formed.

By arranging a sheet-iron tube in line with the mandrel to receive the coiled wire as it is delivered over the nose of the mandrel, and giving the said tube a rotary motion in the same direction as, but a little faster, than the mandrel, the wire is eased off the mandrel and a more perfect spring is produced.

The springs are delivered from the described machine in a connected state; but by a properly-arranged cutter properly placed opposite the largest portion of the mandrel on which the wire is coiled the springs may be cut off as fast as they are completed. If a guide be arranged to conduct the wire to the first roller and the grooves of the rollers be made a little wider than the thickness of the wire, the pitch of the spiral may be varied to a certain extent by moving the guide sidewise.

The diameter of the springs may be increased or diminished by changing the connecting-rod H, that connects the carriage F with the sliding bar I, for a longer or shorter one, or by some provision for shortening or lengthening the said rod, and at the same time moving the collar $t$ on the bar L, so as to throw the rollers altogether nearer to the base or to the nose of the conical mandrel, and thereby causing the spring to be formed on a larger or smaller portion of the mandrel. This allows the same machine to be used for springs of various sizes.

I will here remark that it may be practicable to give the mandrel a longitudinal movement relatively to the rollers, instead of moving the rollers longitudinally to the mandrel, as described, and though I do not contemplate using such an arrangement I regard it as equivalent to the arrangement described. The shaft is represented with a mandrel, D', at the opposite end to D, and by combining with this mandrel a series of rollers, $g$ $g'$ $g^2$, and other appendages like those operating in combination with D the machine will form two springs at a time.

The process of forming springs by this machine differs very materially from the common process of forming them on the block, as the spring, instead of remaining in contact with the surface on which it is formed, is continually moving away. It also differs from the process of forming them by carrying the wire between rollers into contact with its inclined plane. Both of those other processes tend to open any flaws in the wire and stretch the outer side of it in the bend, while the process as performed by this machine tends to compress the wire and close up all flaws and other imperfections in the wire.

What I claim as my invention, and desire to secure by Letters Patent, is—

1. The combination of a revolving mandrel, D, and two or more grooved rollers, arranged and operating together in any manner, substantially as described, for the purpose set forth.

2. The employment of an adjustable springing bed, E, to support the roller-carriage F, or otherwise, in an equivalent manner, applying springs under or at the back of the roller-carriage, for the purpose of enabling the rollers to accommodate their movements exactly to the longitudinal profile and varying diameter of the mandrel, and thus insuring their proper operation.

JAS. HARRISON, JR.

Witnesses:
W. TUSCH,
S. F. COHEN.